2,805,975

ANTIBIOTIC EMBALMING PROCESS

Edgar Kingdon Hamilton, Merrick, N. Y., assignor to Chas. Pfizer & Co., Inc., New York, N. Y., a corporation of Delaware No Drawing. Application December 31, 1952, Serial No. 329,086

1 Claim. (Cl. 167—49.5)

This invention is concerned with certain compositions of matter especially adapted for application to animal bodies, particularly human, for the purpose of embalming and arresting decomposition of the same. These materials may be used not only by application to the surface of the body but particularly by application through the vascular system into body cavities. This invention is also concerned with the process of embalming using these materials.

A variety of solutions or solid products for the preparation of solutions have been suggested for use as embalming materials. Many of these contain formaldehyde bases and others involve phenols and other strong chemical agents. Although these have been widely used, there have been many faults found with them. In the first place, they leave much to be desired in their preserving action on the body. The appearance of the embalmed body is often unnatural in color and texture, and the application of these materials by morticians is often accompanied by injury to these individuals.

It has been indicated lately that tissues embalmed by means of many of the present methods still contain pathogenic organisms which may be of considerable danger to those coming in contact with the embalmed bodies. This is particularly true of physicians who are conducting post-mortem examinations and pathologists studying tissues from embalmed bodies. In particular see L. A. Weed et al., Proceedings of the Staff Meetings of the Mayo Clinic, vol. 27, p. 124 (1952), and Steenken, American Review of Tuberculosis, vol. 59, p. 429–437 (1949).

It has now been found that certain compositions containing one or a mixture of antibiotics (i. e. products of microorganisms which are highly active in suppressing growth of other organisms) in solution, particularly in aqueous or in alcoholic or aqueous-alcoholic solutions which are neutral to acidic in reaction, are excellent agents for use in embalming. These solutions may be made up at concentrations which may be used directly in embalming or there may be prepared dry mixtures or concentrated solutions which, on dilution, are useful for embalming. Furthermore, solid or semi-solid materials such as waxes, creams and ointments of various types may be used as media for the application of the antibiotics. These are also used at neutral to acidic pHs. These forms of the antibiotic may be applied by various methods. The aqueous solutions may be applied to the surface of the body by spraying, sponging and so forth. As noted above, various antibiotics may be used for this purpose and, in general, the solutions actually utilized in the embalming process should have a concentration of at least about 20γ of an antibiotic per milliliter, although higher concentrations are often advisable. A concentration of greater than about one milligram per milliliter is wasteful of the material. The solutions are preferably acidified by means of organic acids, such as citric acid, tartaric acid, acetic acid and so forth. In some cases a buffering combination of a strong base salt of a polybasic acid, and the polybasic acid may be used to maintain a given pH. Solutions having a pH of as low as 1.3 have been successfully used. Solutions having a pH of up to about 7 and no higher than 8 are preferred.

Among the antibiotics which are useful for the preparation of the compositions of this invention are acetopyrrothine, penicillin, polymyxin, oxytetracycline (also known by registered trademark "Terramycin"), dihydrostreptomycin, streptomycin, chlortetracycline, Netropsin, bacitracin, derived microbiologically active materials, and so forth. The antibiotics need not have the low toxicity required of those used in treatment of living patients. Various forms of the antibiotics, such as salts with acids or metals, and various derivatives or other microbiologically active forms may be used. Furthermore, the antibiotics need not be pure crystalline materials but may be used in various crude forms. When we speak of an "oxytetracycline antibiotic" or any other antibiotic, we refer not only to the basic compound itself, but to any salts or other forms as described hereinabove. These materials are soluble in water at least to a limited extent and may readily be prepared in the form of aqueous solutions. The antibiotic chosen should have a fair degree of stability at neutral to acidic pH; that is, the antibiotic should preserve its antibacterial effect for a moderate period after use. Generally, during this time, if the materials are injected in the vascular system, they have penetrated throughout the body and are effective in sterilizing or practically sterilizing the embalmed body. In tests made with these materials, it was found difficult and sometimes impossible to isolate viable microorganisms from tissue samples from embalmed bodies. Furthermore, bodies embalmed with aqueous antibiotic solutions of neutral to acidic reaction have a better appearance, color, texture, pliancy and firmness than do bodies embalmed with various commercially-available embalming preparations. Of course, the acidic to neutral antibiotic preparations may be combined with various conventional embalming materials such as phenol, formaldehyde and so forth.

As noted above, dry preparations for embalming may be prepared in accordance with the provisions of this invention. These are particularly useful and consist of one or more antibiotics and may contain a solid organic acid for adjusting the pH when the material is dissolved before use. Buffering materials such as alkali metal salts of polybasic acids, for example sodium acid phosphate, sodium citrate, and others of the nature, may be used.

The following examples are given by way of illustration and are not intended as a limitation of this invention. Indeed, as many apparently widely different embodiments of the present invenion may be made without departing from the spirit and scope hereof, it is to be understood that the invention is only limited as defined in the appended claim.

Example I

A solution was prepared by dissolving 100 micrograms of acetopyrrothine per milliliter of water. Since this is a neutral compound the pH was approximately 7. The solution was injected through the vascular system in the leg of a person who had died a short time previously. It was observed after several days that the treated member was in good state of preservation. The skin and tissue was soft and pliable and there was no visible evidence of decomposition. Under similar conditions the untreated member was not nearly as well preserved.

Example II

A solution was prepared containing 100 micrograms of acetopyrrothine and 100 micrograms of polymyxin B sulfate per milliliter of water. The solution was approximately neutral in reaction. The solution was injected in the vascular system of one leg of a human corpse that had been dead several days. The treated member then was observed over a period of ten days. It was found that the state of preservation, the texture of the skin and the firmness of the flesh was appreciably better than the other leg of the body which was treated with a solution of formaldehyde such as is commonly for preservation. A second body that was jaundiced was injected in the arm with the polymyxin-acetopyrrothine solution. Observation over a period of five days indicated good preservation, although there is little change in the color of the skin.

*Example III*

A dry composition was prepared containing 67.5 milligrams of oxytetracycline hydrochloride, 54.0 milligrams of streptomycin sulfate and 25.0 grams of citric acid. This quantity was dissolved in 100 milliliters of water. The pH of this solution was 1.3. The solution was injected into the vascular system of the gangrenous left leg of a corpse. Observation over a period of about a week showed that the member treated was thoroughly preserved. There was little evidence of further decomposition and the color and texture of the skin was good. It was also found that application of the same solution to a gangrenous area on the surface of a body was definitely effective in arresting decomposition and helping in the preservation of the corpse. It was found that injection of a formaldehyde solution about 6% concentration by weight into another member of the same body did not give nearly the same degree of control of decomposition that had been obtained with the Terramycinstreptomycin solution.

*Example IV*

A solution was prepared containing 100 micrograms of acetopyrrothine, 100 micrograms of polymyxin and 250 milligrams of citric acid per milliliter of water. The pH of the solution was 1.3. A sample of this solution was injected into the vascular system of the leg of a corpse that was slightly decomposed. The member was observed over a period of two weeks. During this time, there was no further change in the character of the skin which remained soft and pliable and, in general, the state of preservation was good. A formaldehyde solution of about 6% concentration was injected into the other leg of the same individual and observed over the same time. Although preservation was good, the tissue was considerably harder and, after a period of two weeks was definitely more discolored with gross decomposition than was the case when the antibiotic solution was used.

*Example V*

A solution was prepared containing 100 micrograms of acetopyrrothine, 60 milligrams of phenol, 120 milligrams of sodium citrate and 4 milligrams of citric acid per milliliter of water. This solution had a pH of about 6. A sample of this solution was injected into the vascular system of a leg of a corpse and the condition of the member was observed over a period of five days. The injected member was found to be in excellent preservation. The color of the skin was retained with little or no change. The tissue was flexible and in very good condition.

What is claimed is:

A process for embalming which comprises injecting into the vascular system of a dead body a solution consisting of oxytetracycline and streptomycin in water, said solution having a concentration of at least about 20 gamma of antibiotic per milliliter and being acidified with citric acid.

References Cited in the file of this patent

UNITED STATES PATENTS

| | | |
|---|---|---|
| 228,519 | Doremus | June 8, 1880 |
| 2,501,014 | Wintersteiner | Mar. 21, 1950 |
| 2,528,188 | Taylor | Oct. 31, 1950 |
| 2,550,254 | Jensen | Apr. 24, 1951 |
| 2,586,762 | Finlay | Feb. 19, 1952 |
| 2,692,845 | Mast | Oct. 26, 1954 |

FOREIGN PATENTS

| | | |
|---|---|---|
| 502,262 | Belgium | Apr. 14, 1951 |

OTHER REFERENCES

Jour. Bacteriology for Oct. 1943, pp. 386–389.
Food Manufacture for Dec. 1950, pp. 508, 509.